E. L. TUPPER.
INCUBATOR.
APPLICATION FILED DEC. 4, 1912.
1,095,248.
Patented May 5, 1914.
3 SHEETS—SHEET 1.
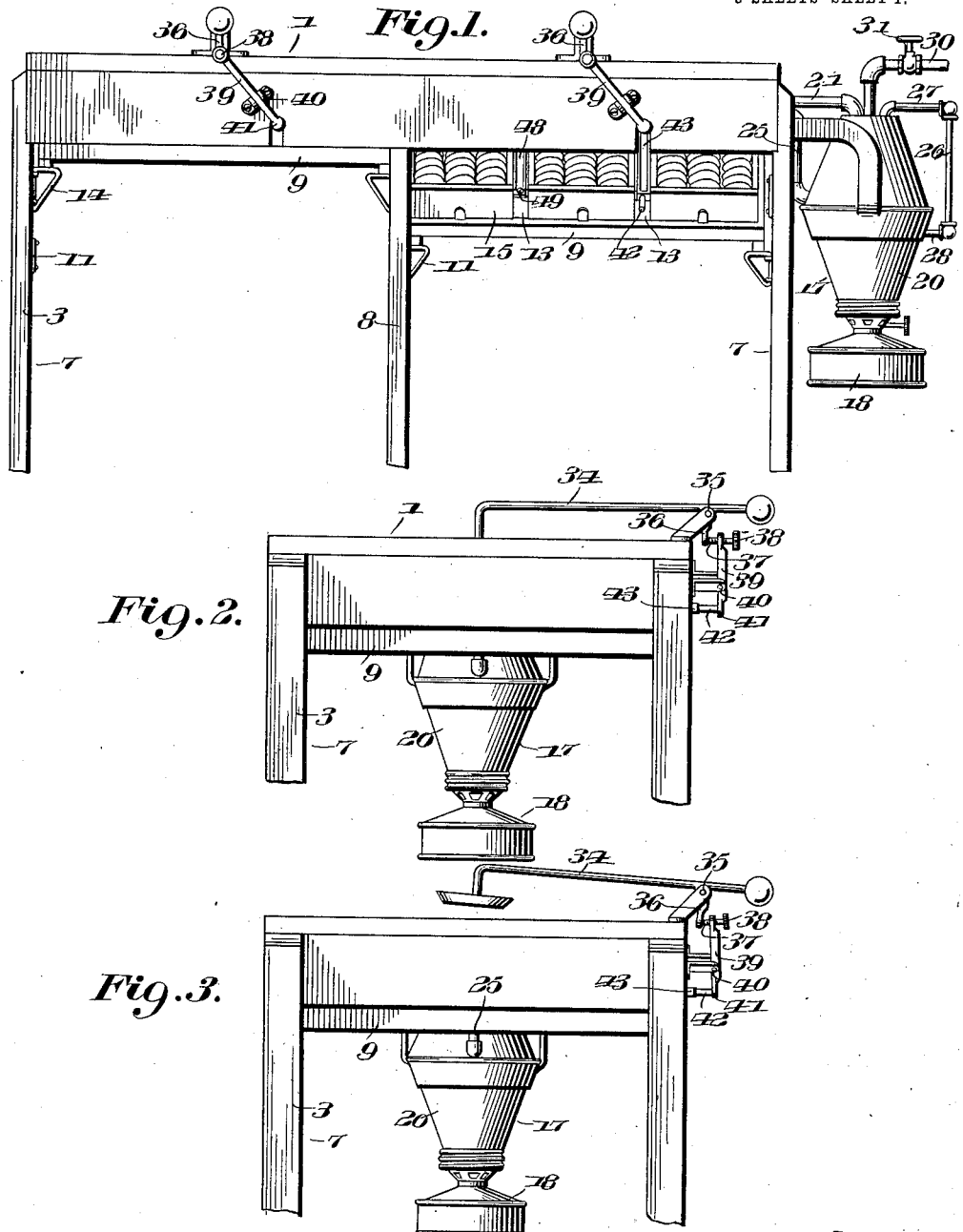
Witnesses
W. H. Sloper.
Dudley B. Howard.
Inventor
Ernest L. Tupper
By Victor J. Evans
Attorney

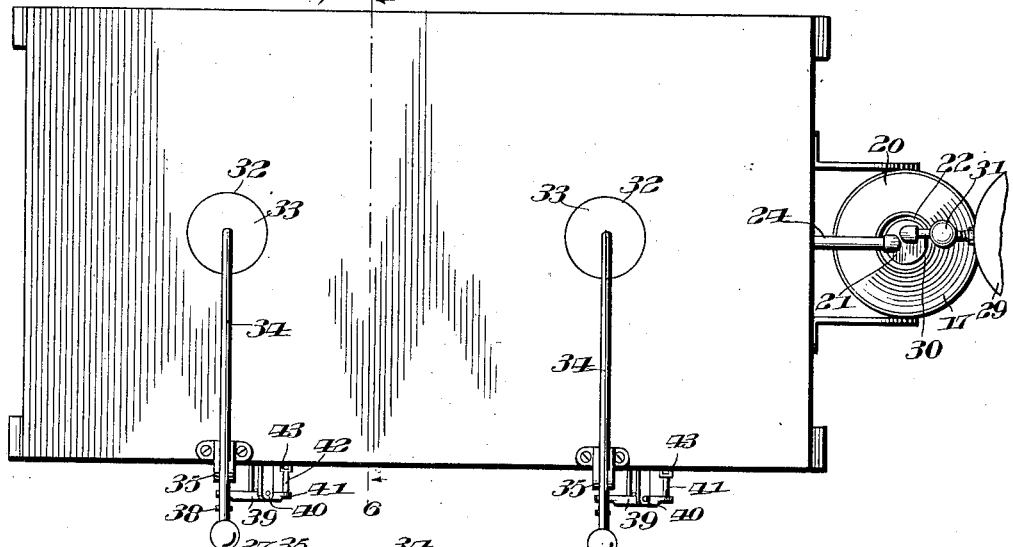

E. L. TUPPER.
INCUBATOR.
APPLICATION FILED DEC. 4, 1912.
1,095,248.
Patented May 5, 1914.
3 SHEETS—SHEET 3.
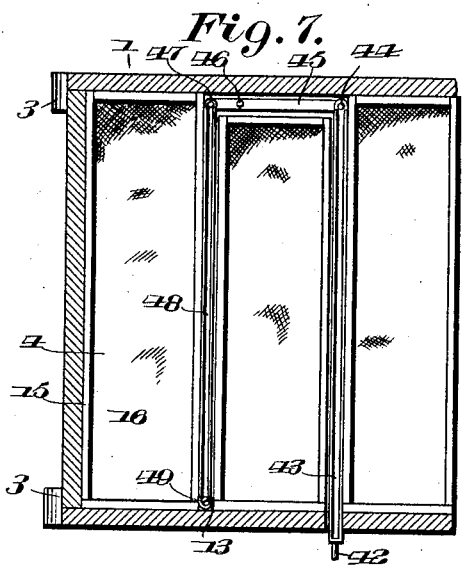
Witnesses
M. H. Hofer.
Dudley B. Howard
Inventor
Ernest L. Tupper
By Victor J. Evans
Attorney

UNITED STATES PATENT OFFICE.

ERNEST L. TUPPER, OF NASHUA, NEW HAMPSHIRE.

INCUBATOR.

1,095,248.

Specification of Letters Patent.

Patented May 5, 1914.

Application filed December 4, 1912. Serial No. 734,887.

*To all whom it may concern:*

Be it known that I, ERNEST L. TUPPER, a citizen of the United States, residing at Nashua, in the county of Hillsboro and State of New Hampshire, have invented new and useful Improvements in Incubators, of which the following is a specification.

This invention relates to an incubator for hatching eggs, the object being to provide an incubator which is adapted to hatch the eggs as near as possible to the manner in which the eggs are hatched by a hen, thus simulating the natural process so as to produce a maximum number of chickens for the number of eggs used.

At the present time, many incubators are being devised and used wherein the principles involved are too artificial and do not approach near enough to the natural process. In most of these present day processes or systems attempts are made to simulate the natural process by circulating air through the eggs and making this air moist, but this is an utter failure, due to the fact that such conditions are not natural. A hen does not breathe through the pores of her skin, for a multitude of dead air spaces are formed between the feathers covering the skin, thus rendering such a circumstance impossible. It is the heat of contact with the hen's body that serves to hatch the eggs, and it is the purpose of my invention to provide a non-porous diaphragm of rubber or some such material, which is to be placed in contact with the upper surface of the eggs, and to provide means for applying a source of heat to the side of the diaphragm opposite to the eggs.

Another defect of modern systems of incubators is the fact that the heated air supplied to the eggs comes directly from a heating flame of some sort and thus is devoid of pure oxygen. When the eggs begin to crack and the chickens come out they have to breathe this obnoxious air, and are in many instances killed or physically stunted thereby. It is the purpose of my invention, however, to provide a support for the eggs of burlap or some such porous material so as to permit fresh air to come in contact with the under surface of the eggs. It will thus be seen, that, when the eggs are hatched, the chickens will be able to breathe the fresh air which penetrates through this supporting material and will thus become healthy and strong.

A further object of the invention is to provide automatically operable means for controlling the supply of heat to the above-mentioned diaphragm, this means being controlled by a specially constructed thermostatic device which is positioned in the same relation to the diaphragm as the eggs themselves, this being necessary because of the fact that the heat applied to the eggs is in direct contact with the diaphragm and not through any heat circulating system, as it has been found in practice that there will be very little heat radiated from a diaphragm of this character.

With these and other objects in view, the invention consists of certain novel features of construction, combination and arrangement of parts, as will be hereinafter described and claimed.

In the accompanying drawings:—Figure 1 is a front elevation of an incubator constructed in accordance with the invention, showing one of the tray supporting frames in closed operative position and the other frame in opened position; Fig. 2 is a side elevation thereof, showing the heat regulating device in normal position; Fig. 3 is a similar view, showing the heat regulating device in opened position as caused by excessive rise in temperature throughout the active face of the operative diaphragm; Fig. 4 is a plan view of the device; Fig. 5 is a longitudinal sectional view through the incubator, showing the heating boiler in transverse section also; Fig. 6 is a transverse sectional view, taken on line 6—6 of Fig. 4; and Fig. 7 is a detail, horizontal sectional view through one of the egg compartments, showing the thermostatic device therein.

In the drawings, the numeral 1 designates an incubator constructed in accordance with the present invention, but it is to be understood that the general principles of the invention may be applied as well to a brooder or like device, as shown in the last two figures of the drawings.

The incubator 1 consists primarily of a heating chamber 2 extending throughout the entire width of the device, supporting legs 3 for the said chamber and a flexible diaphragm 4 of rubber or some such non-porous material forming the entire bottom of the heating chamber, and egg compartments 5 and 6 formed beneath the diaphragm of the heating chamber and which are constructed so that fresh air may enter through the bottom of the same to a limited extent but may not make a draft therethrough. The legs of the incubator are arranged in pairs, the egg compartments being provided between either end pair 7 of legs and the central pair 8. A frame 9 having a plurality of longitudinally extending spaced slats 9$^a$ is mounted for vertical swinging movement between each end pair of legs and the central pair and forms the base of the egg compartments, it being hinged at its rear end, as at 10, between the rearmost ends of each pair and is adapted to be supported at its front end by a pair of brackets 11 mounted upon the front legs of each pair when in opened position. When in opened position, each supporting frame is adapted to have a plurality of egg trays, preferably three in number, placed thereupon in spaced relation so as to provide the spaces 13 therebetween. Then the frame upon which the trays are mounted may be swung upwardly into horizontal position and may be secured in this position by swinging a pair of horizontally movable supporting brackets 14 into position beneath the front portion thereof.

Each egg tray 15 is provided with a bottom 16 of burlap or some such porous material, so that air may penetrate through the spaces between the slats 9$^a$ and the said tray bottoms into the same. This air is thus "dead air" as it may be termed, and yet contains the necessary amount of oxygen for the sustaining of life within the eggs, as the latter are porous themselves, and for the subsistence of the chickens when hatched.

The means for heating the air within the heating chamber comprises a boiler 17 adapted to be heated by a lamp 18 or some such source of heat and a heating coil 19 provided within the heating chamber. Any suitable construction of boiler might be used, but it is intended to provide a specially constructed boiler which will be very efficient in operation and will afford a constant source of heat at a comparatively even temperature. In the construction of this boiler, a double frusto-conical heating jacket 20 is provided with both ends open, its lower end being adapted to be positioned above the flame of a lamp or some such source of heat. A vertically-disposed, cylindrical header 21 extends downwardly through the upper end of the jacket 20, it being of less diameter than the opening therein so as to provide a space 22 for the passage of air in order to provide proper draft, and has attached to its lower, closed end a plurality of downwardly extending spaced tubes 23, whose upper ends are in open communication with the drum or header 21 and whose lower ends are closed. The upper feed end of the drum 21 is connected by means of a feed pipe 24 with the coil 19 within the heating chamber of the incubator and a return pipe 25 connects the coil with the lower end of the drum 21. A water gage 26 of suitable construction is connected to the upper and lower ends of the drum by means of the valved pipes 27 and 28, so that the level of the water within the drum may be ascertained at any time. A reservoir 29 is connected with the upper end of the drum 21 by means of a pipe 30 having a valve 31 provided therein so as to control the admission of water. It will thus be seen that I have provided a simple construction of water tube boiler which is adapted specially for use in this connection and wherein the drum 21 serves partially as a steam drum and partially as a container for the water so as to afford constant supply of the same to the tubes 23.

It will be apparent that either of the egg compartments may be used individually or both may be used at the same time and for this reason it is necessary to provide means for controlling the heat within either side portion of the heating chamber in order to properly regulate the heat being applied to the eggs within the egg compartment beneath the same through the corresponding portion of the flexible diaphragm. I have, therefore, provided a pair of openings 32 in the top of the heating chamber, each being disposed above one of the egg compartments. A disk shaped cover 33 for each opening 32 is mounted upon the inner end of a counterbalanced lever 34 which is pivoted to the top of the heating chamber at 35. This lever 34 is provided at its point of pivotal attachment with a depending arm 36 which is adapted to be engaged by the active end 37 of an adjustable regulating screw 38 mounted in the upper end of an inclined lever 39, which latter is pivoted as at 40 adjacent its lower end. The lower end 41 of the lever 39 is adapted to be in constant engagement with a rod member 42 extending from the free end of an expansible member 43 disposed within the corresponding space 13 between the egg trays, and which is constructed preferably of zinc, which metal has a high coefficient of expansion. The other end of the member 43 is pivotally attached at 44 to a transversely extending transmission lever 45 constructed preferably of iron and which is pivoted at 46 opposite its other end. The end of the short arm of this lever 45 is pivotally connected at 47 to the rearmost end of a second expansible member 48 similar to the member 43 and positioned within the space 12, its forward end being fixedly secured as at 49 to the front edge of the frame 9. It will thus be seen that, should the diaphragm 4 become excessively heated, the expansible members 43 and 48 which are in direct contact with the active under surface of the diaphragm will expand to such an extent that operation of the lever 39 will be caused. This operation will cause the adjustable screw 38 to move so that its active end 37 will engage the arm 36 of the lever 34. At the moment in which this occurs, the necessary heat will have reached its maximum limit. A further rise in temperature, which would be dangerous, will then cause further movement of the lever 39 thus causing operation of the lever 34 and resultant elevation of the closure 33 from the corresponding opening 32 in the heating chamber. The excessively heated air within the chamber will thus be permitted to escape through the said openings and the heat being applied to the upper surface of the flexible diaphragm immediately above this particular egg compartment will thus be reduced to a normal temperature.

Having thus described my invention, what I claim is:—

1. An incubator comprising a supporting frame, a heating chamber mounted upon said frame, a tray-holding frame mounted beneath the heating chamber, a plurality of egg trays adapted to be mounted upon said frame and including a medially disposed tray and trays disposed at either side thereof forming spaces therebetween, a thermostatic device comprising an expansible rod extending horizontally through one of the said spaces and having one end thereof fixedly connected to the tray-holding frame with its opposite end projecting outwardly from the trays, a lever pivotally mounted upon the frame for horizontal movement and having one of its ends pivoted to the free end of the expansible rod, a second expansible rod pivotally connected to the opposite end of the said lever and extending through the other space between the trays, a non-porous diaphragm forming the bottom wall of the heating chamber and adapted to sag into engagement with the said expansible rods, the heating chamber being provided with an opening, a closure for the said opening, and means connecting the said closure with the second expansible rod of the thermostatic device by which the said closure will be operated upon longitudinal motion of the rod.

2. An incubator comprising a supporting frame, a heating chamber mounted upon said frame, a tray-holding frame mounted beneath the heating chamber, a plurality of egg trays adapted to be mounted upon said frame and including a medially disposed tray and trays disposed at either side thereof forming spaces therebetween, a thermostatic device comprising an expansible rod extending horizontally through one of the said spaces and having one end thereof fixedly connected to the tray-holding frame with its opposite end projecting outwardly from the trays, a lever pivotally mounted upon the frame for horizontal movement and having one of its ends pivoted to the free end of the expansible rod, a second expansible rod pivotally connected to the opposite end of the said lever and extending through the other space between the trays having an engaging projection upon its free end, the said heating chamber being provided with a top opening, a vertically movable lever pivotally mounted upon the said chamber exteriorly with respect thereto, a closure for the said opening attached to one end of the lever, a counterbalancing weight carried by the opposite end of the lever, the said lever being provided at its point of pivotal attachment with a depending arm, and a transmitting lever pivotally mounted upon one of the vertical walls of the chamber with its lower end adapted for engagement with the projection of the said expansible rod and having its opposite end engageable with the depending arm of the counterbalanced lever.

3. An incubator comprising a supporting frame, a heating chamber mounted upon said frame, a tray-holding frame mounted beneath the heating chamber, a plurality of egg trays adapted to be mounted upon said frame and including a medially disposed tray and trays disposed at either side thereof forming spaces therebetween, a thermostatic device comprising an expansible rod extending horizontally through one of the said spaces and having one end thereof fixedly connected to the tray-holding frame with its opposite end projecting outwardly from the trays, a lever pivotally mounted upon the frame for horizontal movement and having one of its ends pivoted to the free end of the expansible rod, a second expansible rod pivotally connected to the opposite end of the said lever and extending through the other space between the trays having an engaging projection upon its free end, the said heating chamber being provided with a top opening, a vertically movable lever pivotally mounted upon the said chamber exteriorly with respect thereto, a closure for the said opening attached to one end of the lever, a counterbalancing weight carried by the opposite end of the lever, the said lever being provided at its point of pivotal attachment with a depending arm, a transmitting lever pivotally mounted upon one of the vertical walls of the chamber with its lower end adapted for engagement with the projection of the said expansible rod, and an adjustable screw member mounted in the opposite end of the said lever for engagement with the depending arm of the counterbalanced lever.

In testimony whereof I affix my signature in presence of two witnesses.

ERNEST L. TUPPER.

Witnesses:
 IVORY C. EATON,
 HELEN E. WOODBURY.

---

Copies of this patent may be obtained for five cents each, by addressing the "Commissioner of Patents, Washington, D. C."